(12) United States Patent
Krajewski

(10) Patent No.: US 9,061,586 B2
(45) Date of Patent: Jun. 23, 2015

(54) MOTOR VEHICLE DRIVE ARRANGEMENT

(71) Applicant: Christian Krajewski, Ostfildern-Ruit (DE)

(72) Inventor: Christian Krajewski, Ostfildern-Ruit (DE)

(73) Assignee: DAIMLER AG, Stuttgart (DE)

( * ) Notice: Subject to any disclaimer, the term of this patent is extended or adjusted under 35 U.S.C. 154(b) by 215 days.

(21) Appl. No.: 13/757,804

(22) Filed: Feb. 3, 2013

(65) Prior Publication Data
US 2014/0216206 A1 Aug. 7, 2014

Related U.S. Application Data

(63) Continuation of application No. PCT/EP2011/003767, filed on Jul. 27, 2011.

(30) Foreign Application Priority Data

Aug. 7, 2010 (DE) .......................... 10 2010 034 225

(51) Int. Cl.
*F16H 37/06* (2006.01)
*B60K 17/36* (2006.01)

(52) U.S. Cl.
CPC ........... *B60K 17/36* (2013.01); *Y10T 74/19019* (2015.01)

(58) Field of Classification Search
USPC ........ 74/664, 665 F, 665 GA, 665 GB, 665 T
See application file for complete search history.

(56) References Cited

U.S. PATENT DOCUMENTS

| 5,964,126 | A | * | 10/1999 | Okcuoglu | ........................ 74/650 |
| 6,138,528 | A | * | 10/2000 | Fukumoto et al. | ............... 74/745 |
| 6,513,399 | B2 | * | 2/2003 | Lamela | ............................ 74/331 |
| 7,357,210 | B2 | * | 4/2008 | Ima et al. | ....................... 180/233 |
| 7,938,041 | B1 | * | 5/2011 | Shiigi et al. | ..................... 74/650 |
| 8,096,202 | B2 | * | 1/2012 | Komori | ............................ 74/325 |
| 2001/0004031 | A1 | * | 6/2001 | Hasegawa | ..................... 180/400 |

FOREIGN PATENT DOCUMENTS

DE  10 2006 045 007  2/2008

* cited by examiner

*Primary Examiner* — Ha D Ho
(74) *Attorney, Agent, or Firm* — Klaus J. Bach

(57) ABSTRACT

In a motor vehicle drive arrangement having a main drive train for driving a main axle and an auxiliary drive train for driving an auxiliary drive axle, with a power shift clutch for connecting the auxiliary drive train to the main drive train, the auxiliary drive train comprises at least one switching unit for engaging the power shift clutch which is arranged in the power flow in series with the switching unit without a differential speed.

13 Claims, 4 Drawing Sheets

MOTOR VEHICLE DRIVE ARRANGEMENT

This is a Continuation-In-Part application of pending international patent application PCT/EP2011/003767 flied Jul. 27, 2011 and claiming the priority of German patent application 10 2010 034225.4 filed Aug. 7, 2010.

BACKGROUND OF THE INVENTION

The invention relates to a motor vehicle drive arrangement comprising a main drive train and an auxiliary drive train for driving a main, and respectively, an auxiliary drive axle.

DE 10 2006 045 007 A1 already discloses a motor vehicle drive arrangement having at a main drive train for driving a main drive axle and having an auxiliary drive train for driving an auxiliary drive axle, and also a power-shift clutch for connecting the auxiliary drive train to the main drive train.

It is the principal an object of the present invention to provide a motor vehicle drive arrangement which can be operated with improved efficiency.

SUMMARY OF THE INVENTION

In a motor vehicle drive arrangement having a main drive train for driving a main axle and an auxiliary drive train for driving an auxiliary drive axle, with a power shift clutch for connecting the auxiliary drive train to the main drive train, the auxiliary drive train comprises at least one switching unit for engaging the power shift clutch which is arranged in the power flow in series with the switching unit without a differential speed.

It is proposed that the auxiliary drive train comprise at least one switching unit which is provided for switching the clutch device without a differential speed. The clutch device can be decoupled from a power flow of the main drive train, whereby in particular drag torques, which can arise when a part of the clutch device is driven via the main drive train, can be reduced. Torque losses during driving can thereby be reduced, whereby efficiency is increased. A "drive axle" is intended to mean in particular a unit composed of components arranged substantially coaxially with each other which are provided at least in part for transmitting a torque for a drive of a motor vehicle. The drive axle thereby comprises, for transmitting a drive torque, in particular two drive wheels and two wheel drive shafts each of which is connected rotationally securely to one of the drive wheels. A "power-shift clutch" is furthermore to be understood in particular to be a unit provided to produce a rotationally secure connection between two components which can be rotated relative to each other if a torque is present on at least one of the components which substantially corresponds to a maximum torque which can be transmitted by the clutch. A "switching unit" is to be understood furthermore to be a mechanically switchable unit which is provided to produce a rotationally secure connection between two components which can be rotated relative to each other. The switching unit thus forms in particular a clutch. "Shift without speed" is thereby intended to mean in particular that a differential speed in the clutch device can be equal to zero if a differential speed between the main drive train and the auxiliary drive train is not equal to zero, i.e. in particular in an operating state, in which at least a part of the auxiliary drive train has a speed of zero and at least a part of the main drive train has a speed greater than zero. "Provided" is intended to mean specially programmed, equipped and/or designed.

According to an advantageous embodiment the switching unit is to be decoupled in at least one operating state from the main drive train and/or a part of the auxiliary drive train. A torque application to the clutch device can thereby advantageously be reduced, whereby in particular the drag torques can be further reduced. "Decouple" is intended to mean in particular that the clutch is completely decoupled from a torque transmission from the main drive train.

The switching unit is preferably formed as a positive-locking clutch. The switching unit can thereby be realized constructively simply. In addition a switching unit can be provided which comprises a low drag torque when it is opened. A "positive-locking clutch" is thereby to be understood in particular as a switching unit which is provided to transmit a torque via a positive-locking connection, such as in particular a claw clutch.

It is further proposed that the auxiliary drive train comprises at least one spur gear stage, with an idler, arranged in the force flow before the clutch and that the switching unit is provided to connect the idler in a rotationally secure way. A particularly simple embodiment can thus be found for the switching unit. An "idler" is thereby to be understood to be a gearwheel arranged coaxially with a shaft or another component which, in at least one operating state, is relative to the shaft or the other rotatable component and which is provided to be rotationally securely connected to the shaft or the other rotatable component. "Rotationally securely connected" should thereby be understood to be a rotationally secure, i.e. rigid connection to a component arranged coaxially with the idler.

The main drive train advantageously comprises a main drive shaft, with which the idler is coaxially arranged. An existing construction space can thereby be advantageously used. In addition a number of the components which are decoupled by means of the switching unit from the main drive train can be advantageously increased, whereby a particularly high efficiency can be achieved.

The switching unit is provided particularly advantageously to connect the idler rotationally securely to the main drive shaft. The idler can thus be advantageously connected to the main drive shaft for torque transmission. The switching unit preferably comprises a sliding sleeve which is provided as a positive-locking element to connect the idler rotationally securely to the main drive shaft.

It is further proposed that the switching unit be arranged directly adjacent to the clutch device. Drag torques can thereby be kept low as a number of intermediately arranged components can be kept low. "Directly adjacent" is thereby to be understood in particular in that a component of the switching unit is directly connected to a component of the clutch device, i.e. that in particular a shaft and/or a gearwheel stage between the clutch device and the switching unit is/are omitted.

The switching unit preferably comprises at least one positive-locking element which is connected rotationally securely to an input element of the clutch device. A simple connection between the clutch device and the shift unit can thereby be realized.

According to an alternative embodiment it is proposed that the switching unit comprise at least one positive-locking element which is connected rotationally securely to an output element of the clutch device. Further advantageous embodiments can thereby be provided.

It is further proposed that the spur gear stage should comprise a fixed gear which is coupled rotationally securely to an input element of the clutch device. The clutch device can thereby be advantageously connected to the spur gear stage. An "input element" is thereby to be understood in particular as a component of the clutch device which is arranged in relation to a force flow leaving the main drive train on the input side, i.e. before a separating point, at which the opened clutch device interrupts the force flow. A "rotationally secure connection" is to be understood in particular as a permanent, rigid connection.

It is further proposed that the auxiliary drive train comprise an auxiliary drive shaft arranged coaxially with the clutch device, said auxiliary drive shaft being rotationally securely connected to an output element of the clutch device. The clutch device can thereby be arranged particularly advantageously.

According to a particularly advantageous embodiment the auxiliary drive shaft is arranged offset relative to the main drive shaft and the gearwheel pairing is provided in at least one operating state to connect the auxiliary drive shaft to the main drive shaft. The auxiliary drive shaft can thereby be advantageously guided past an axle drive of the main drive train. In addition the clutch device is thereby also arranged offset relative to the main drive shaft, whereby an advantageous arrangement of the clutch device can be realized.

It is proposed according to a further development that the switching unit be synchronized. A switchability of the switching unit can thereby be increased, whereby the clutch device can be easily connected to the main drive shaft by means of the switching unit.

In addition it is proposed that the auxiliary drive train comprise at least one clutch unit which is arranged in the force flow after the clutch device and the switching unit and is provided to decouple at least one drive wheel of the auxiliary drive axle from the clutch device. A part of the drive train can thereby be completely excluded from a rotation movement, in particular in a normal operating mode which is provided for a normal driving operation, whereby efficiency can be further improved.

It is further proposed that the vehicle drive device comprise a control and regulating unit which is provided to close the switching unit at least in a standby operating mode. The auxiliary drive train can thereby be advantageously prepared for a transmission of the drive torque. A "standby operating mode" is thereby to be understood in particular as an operating mode, in which at least the switching unit is closed for connection of the clutch device, wherein the auxiliary drive train is interrupted at at least one point, such as in particular by the clutch device, which is advantageously opened in the standby operating mode.

In addition the invention works on the basis of a method for an motor vehicle drive device, in which at least one main drive train drives a main drive axle and at least one auxiliary drive train drives an auxiliary drive axle, and a power-shift clutch device connects the auxiliary drive axle to the main drive train. It is proposed that the clutch device be decoupled from the main drive train in at least one operating state, whereby the efficiency of the motor vehicle drive device can be improved.

The invention will become more readily apparent from the following description of four exemplary embodiments of the invention with reference to the accompanying drawings.

DESCRIPTION OF EXEMPLARY EMBODIMENTS

Figure 1:
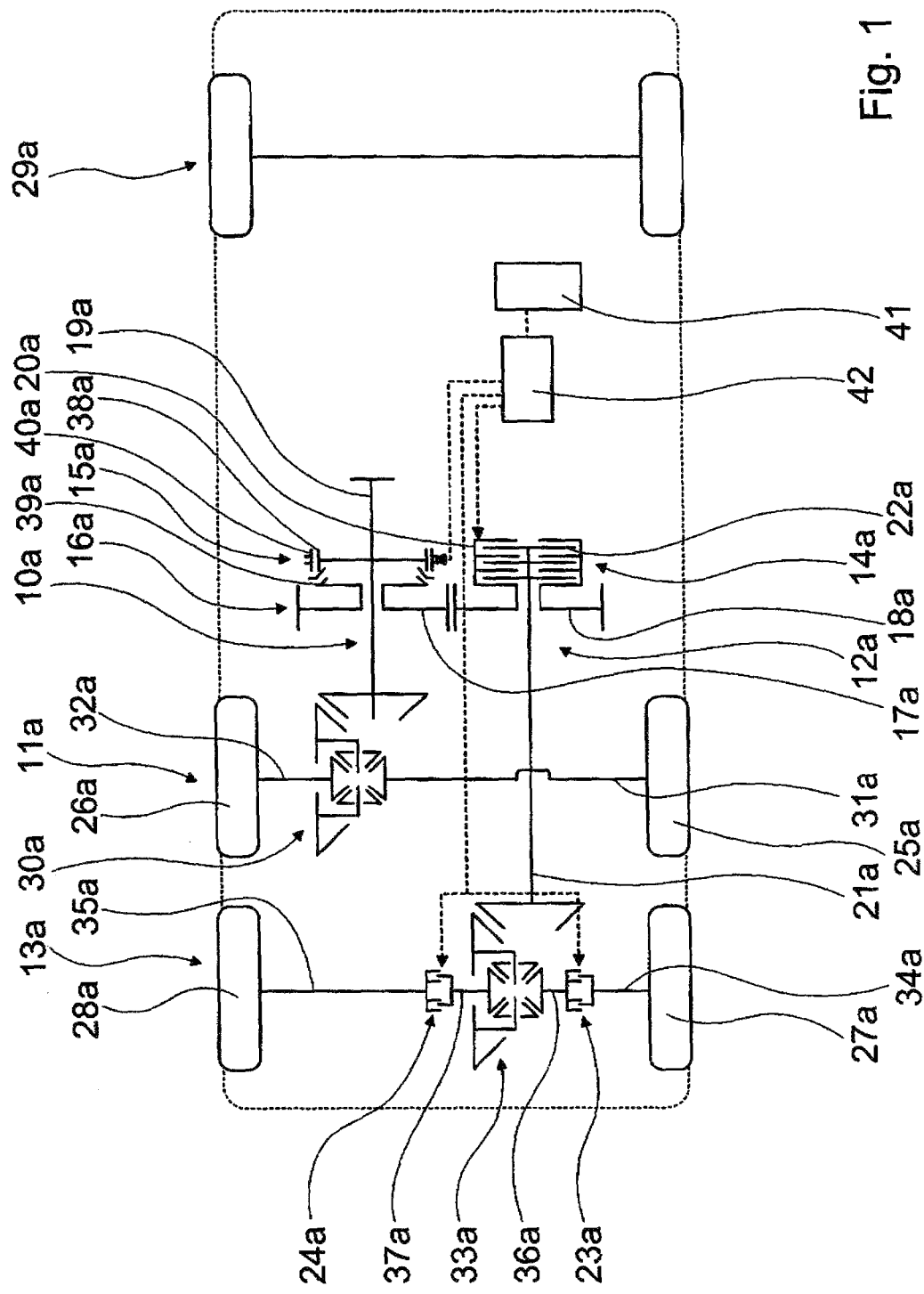
FIG. 1 shows a motor vehicle drive arrangement with a switching unit which is provided to decouple a power-shift clutch device from a main drive train.

FIG. 1 shows schematically a motor vehicle having a motor vehicle drive arrangement according to the invention. The motor vehicle drive arrangement is formed as a truck drive train. The motor vehicle drive arrangement comprises a main drive train 10a and an auxiliary drive train 12a. The main drive train comprises a main drive axle 11a permanently driven via the main drive train 10a and an auxiliary drive axle 13a which can be driven as required. The main drive axle 11a comprises two drive wheels 25a, 26a which can be driven by way of the main drive train 10a. The auxiliary drive axle 13a comprises two drive wheels 27a, 28a which can be driven by way of the auxiliary drive train 12a. In addition the motor vehicle comprises a non-driven drive axle 29a which is formed as a front wheel axle.

The main drive axle 11a is permanently connected to the main drive train 10a. The main drive train 10a comprises a main drive shaft 19a and an axle drive 30a. The main drive shaft 19a is directly connected to a drive unit via a main clutch (not shown in further detail) and a vehicle transmission for switching between different gears. For driving the main drive axle 11a, the axle drive 30a comprises a differential with a drive pinion and a crown gear. In addition the axle drive 30a comprises a differential lock which is not shown in further detail. Furthermore the main drive train 10a comprises two wheel drive shafts 31a, 32a which are respectively rotationally securely connected to one of the drive wheels 25a, 26a of the main drive axle 29a. The main drive shaft 19a is constantly coupled to the axle drive 30a. The differential lock locks the differential as required in that it connects the wheel drive shafts 31a, 32a rotationally securely to each other. The wheel drive shafts 31a, 32a are permanently coupled to the main drive shaft 19a via the axle drive 30a.

In order to connect the auxiliary drive axle 13a, which can be decoupled, to the main drive train 10a or to the permanently driven main drive axle 11a, the auxiliary drive train 12a comprises a power-shift clutch device 14a. The clutch device 14a connects the auxiliary drive train 12a as required to the main drive shaft 19a. The clutch device 14a is formed as a multi-plate clutch. The clutch device 14a comprises a plurality of plates for producing a rotationally secure connection, each plate having a friction lining. In order to produce a friction-locking connection, the plates of the coupling device 14a are pressed against each other so that the friction linings of the plates are in frictional contact. The clutch device 14a comprises an input element 20a, via which a drive torque is introduced into the clutch device 14a, and an output element 22a, via which the drive torque can be conveyed out of the clutch device 14a. The input element 20a is formed as an outer plate support. The output element 22a is formed as an inner plate support.

The auxiliary drive train 12a comprises an auxiliary drive shaft 21a and two wheel drive shafts 34a, 35a. The auxiliary drive train 12a further comprises two intermediate shafts 36a, 37a and two coupling units 23a, 24a which are provided to connect one of the intermediate shafts 36a, 37a rotationally securely to one of the wheel drive shafts 34a, 35a. In order to connect the intermediate shafts 36a, 37a to the auxiliary drive shaft 21a, the auxiliary drive train 12a comprises an axle drive 33a with a differential. The differential comprises a drive pinion and a crown gear. The auxiliary drive shaft 21 is constantly coupled with the axle drive 33a. The axle drive 33a comprises a differential lock which locks the differential as required insofar as it connects the intermediate shafts 36a, 37a rotationally securely to each other. The intermediate shafts 36a, 37a are permanently coupled to the auxiliary drive shaft 21a via the axle drive 33a. The wheel drive shafts 34a, 35a can be connected as required to the intermediate shafts 36a, 37a, The clutch units 23a, 24a are formed as claw clutches with positive-locking switching.

In principle it is also conceivable for the intermediate shafts 36a, 37a of the auxiliary drive train 12a to be connected via a conversion gear at equal speeds to the auxiliary drive shaft 21a. The two intermediate shafts 36a, 37a would be rotationally securely connected to each other in such an embodiment or be designed in one part. The axle drive 33a would merely comprise the conversion gear. The crown gear of the axle drive 33a which, together with the drive pinion, forms the conversion gear would be connected rotationally securely to the intermediate shafts 36a, 37a, A differential functionality could be assumed by the clutch units 23a, 24a. The clutch units 23a, 24a are arranged in the force flow behind the axle drive 33a. The clutch unit 23a is arranged in the force flow between the axle drive 33a and the first drive wheel 27a. The clutch unit 24a is arranged in the force flow between the axle drive 33a and the second drive wheel 28a.

In order to decouple the clutch device 14a from the main drive train 10a the motor vehicle drive device comprises a switching unit 15a connected in series with the clutch device 14a. The switching unit 15a is formed as a positive-locking clutch. By means of the switching unit 15a, the clutch device 14a can be connected without a differential speed. The auxiliary drive shaft 21a is arranged offset relative to the main drive shaft 19a. In order to connect the auxiliary drive shaft 21a to the main drive shaft 19a, the auxiliary drive train 12a comprises a spur gear stage 16a. The spur gear stage 16a comprises an idler 17a and a fixed gear 18a. The idler 17a is arranged coaxially with the main drive shaft 19a. The fixed gear 18a is arranged coaxially with the clutch device 14a and thus coaxially with the auxiliary drive shaft 21a.

The switching unit 15a is formed as a claw clutch coupling in a positive-locking manner. The switching unit 15a comprises three positive-locking elements 38a, 39a, 40a, which respectively have toothed areas for positive-locking engagement. The positive-locking element 38a is rotationally securely connected to the main drive shaft 19a. The positive-locking element 39a is rotationally securely connected to the idler 17a. The third positive-locking element 40a is connected rotationally securely but axially displaceably to the positive-locking element 38a. The positive-locking element 40a forms a sliding sleeve which is displaced, for rotationally secure connection of the idler 17a to the main drive shaft 19a, into a switching position. In a neutral position of the positive-locking element 40a, the idler 17a is decoupled from the main drive shaft 19a, i.e. can be rotated relative to the main drive shaft 19a.

The switching unit 15a is synchronized. It comprises a synchronization which is activated during a switching process of the positive-locking element 40a from the neutral position into the switching position. The synchronization comprises a synchronous ring which is activated by the positive-locking element 40a formed as a sliding sleeve. In the activated state the synchronous ring produces a friction-locking connection to the positive-locking element 39a, which is rotationally securely connected to the idler 17a.

The input element 20a of the clutch device 14a is rotationally securely connected to the fixed gear 18a. In an operating state, in which the switching unit 15a is closed and the idler 17a is rotationally securely connected to the main drive shaft 19a, the input element 20a of the clutch device 14a has a speed which is defined by a speed of the main drive shaft 19a and a transmission ratio of the spur gear stage 16a. In such an operating state, at least the spur gear stage 16a of the auxiliary drive train 12a is coupled to the main drive shaft 19a.

The output element 22a of the clutch device 14a is connected rotationally securely to the auxiliary drive shaft 21a. By closing the clutch device 14a, the auxiliary drive shaft 21a can be coupled to the main drive shaft 19a. The two coupling units 23a, 24a are arranged in the force flow after the clutch device 14a and the switching unit 15a. When the two clutch units 23a, 24a and the switching unit 15a are closed, the drive wheels 27a, 28a of the auxiliary drive axle 13a can be connected to the main drive shaft 19a by means of the clutch device 14a.

In order to control the switching unit 15a, the clutch device 14a and the clutch units 23a, 24a, the motor vehicle drive device comprises a control and regulating unit 41. Furthermore the motor vehicle drive train device comprises an actuating unit 42 (shown schematically) which has actuators for the switching unit 15a, the clutch device 14a and the clutch units 23a, 24a. The control and regulating unit 41 is provided for controlling the actuating unit 42.

The control and regulating unit 41 is provided to independently regulate connection of the auxiliary drive train 12a to the main drive train 10a. The control and regulating unit 41 comprises three operating modes, that is, a normal operating mode, a standby operating mode and an auxiliary operating mode.

In the normal operating mode, the switching unit 15a, the clutch device 14a and the clutch units 23a, 24a are opened. No torque is transmitted to the auxiliary drive train 12a. The drive wheels 27a, 28a of the auxiliary drive axle 13a are dragged along load-free. A drive torque for driving the motor vehicle is merely transmitted via the main drive axle 11a. The control and regulating unit 41 is provided to carry out the normal operating mode from a threshold speed of 30 km/h.

In the standby operating mode, the control and regulating unit 41 is provided to close at least one of the two clutch units 23a, 24a. Furthermore the control and regulating unit 41 closes the switching unit 15a in the standby operating mode. The clutch device 14a is opened in the standby operating mode. In the standby operating mode a torque transmitted via the auxiliary drive train 12a is also equal to zero. The control and regulating unit 41 is provided to trigger the standby operating mode in case of a threshold speed below 30 km/h.

In the auxiliary operating mode, the clutch device 14a is closed. Furthermore the control and regulating unit 41 in the auxiliary operating mode closes both clutch units 23a, 24a. The switching unit 15a is also closed in the auxiliary operating mode. The control and regulating unit 41 is set to switch the auxiliary operating mode at a speed of below 30 km/h and a detected slip of the main drive axle 11a, i.e. a spinning of at least one of the drive wheels 25a, 26a. In the auxiliary operating mode a torque is transmitted via the auxiliary drive train 12a to the drive wheels 27a, 28a.

The control and regulating unit 41 senses via a sensor system (not shown in greater detail) a speed of the motor vehicle. If the control and regulating unit 41 detects that the speed lies below the threshold speed, it switches into the standby operating mode. In order to switch into the standby operating mode, the control and regulating unit 41 closes the switching unit 15*a* and at least one of the two clutch units 23*a*, 24*a*.

If the control and regulating unit 41 detects, during the standby operating mode, that is at a speed of the motor vehicle below the threshold speed, a slip of the main drive axle 11*a*, the control and regulating unit 41 switches into the auxiliary operating mode. If the two clutch units 23*a*, 24*a* are not yet closed, the control and regulating unit 41 closes the clutch units 23*a*, 24*a* with the establishment of the auxiliary operating mode. The drive wheels 27*a*, 28*a* are thereby coupled via the clutch units 23*a*, 24*a* to the auxiliary drive shaft 21*a*. The control and regulating unit 41 then closes the clutch device 14*a*. The switching unit 15*a* is already closed by switching the standby operating mode. By closing the clutch device 14*a*, the control and regulating unit 41 connects the auxiliary drive shaft 21*a* to the main drive shaft 19*a*. The drive wheels 27*a*, 28*a* of the auxiliary drive axle 13*a* are thus also driven. They thus support the drive wheels 25*a*, 26 of the main drive axle 11*a* which are permanently connected to the main drive shaft 19*a*.

If the control and regulating unit 41 detects that the speed of the vehicle is greater than the threshold speed, the control and regulating unit 41 switches from the auxiliary operating mode into the normal operating mode. The clutch device 14*a*, the switching unit 15*a* and the two clutch units 23*a*, 24*a* are opened again. In principle the control and regulating unit 41 can also evaluate other or further disconnection parameters for disconnecting the auxiliary operating mode. For example it is conceivable that the control and regulating unit 41 switches off the auxiliary operating mode if no slip arises on the main drive axle 11*a* for a defined time period.

Three further exemplary embodiments of the invention are shown in FIGS. 1 to 4. The following descriptions are substantially limited to the differences between the exemplary embodiments, whereby reference can be made to the description of the other exemplary embodiments, in particular of FIG. 1, in relation to components, features and functions remaining the same. In order to differentiate between the exemplary embodiments, the letter "a" in the reference symbols of the exemplary embodiment in FIG. 1 is replaced by the letters "b" to "d" in the reference symbols of the exemplary embodiments of FIGS. 2 to 4. Having regard to components with the same name, in particular having regard to components with the same reference symbols, reference can be made in principle also to the drawings and/or the description of the other exemplary embodiments, in particular FIG. 1.

Figure 2:
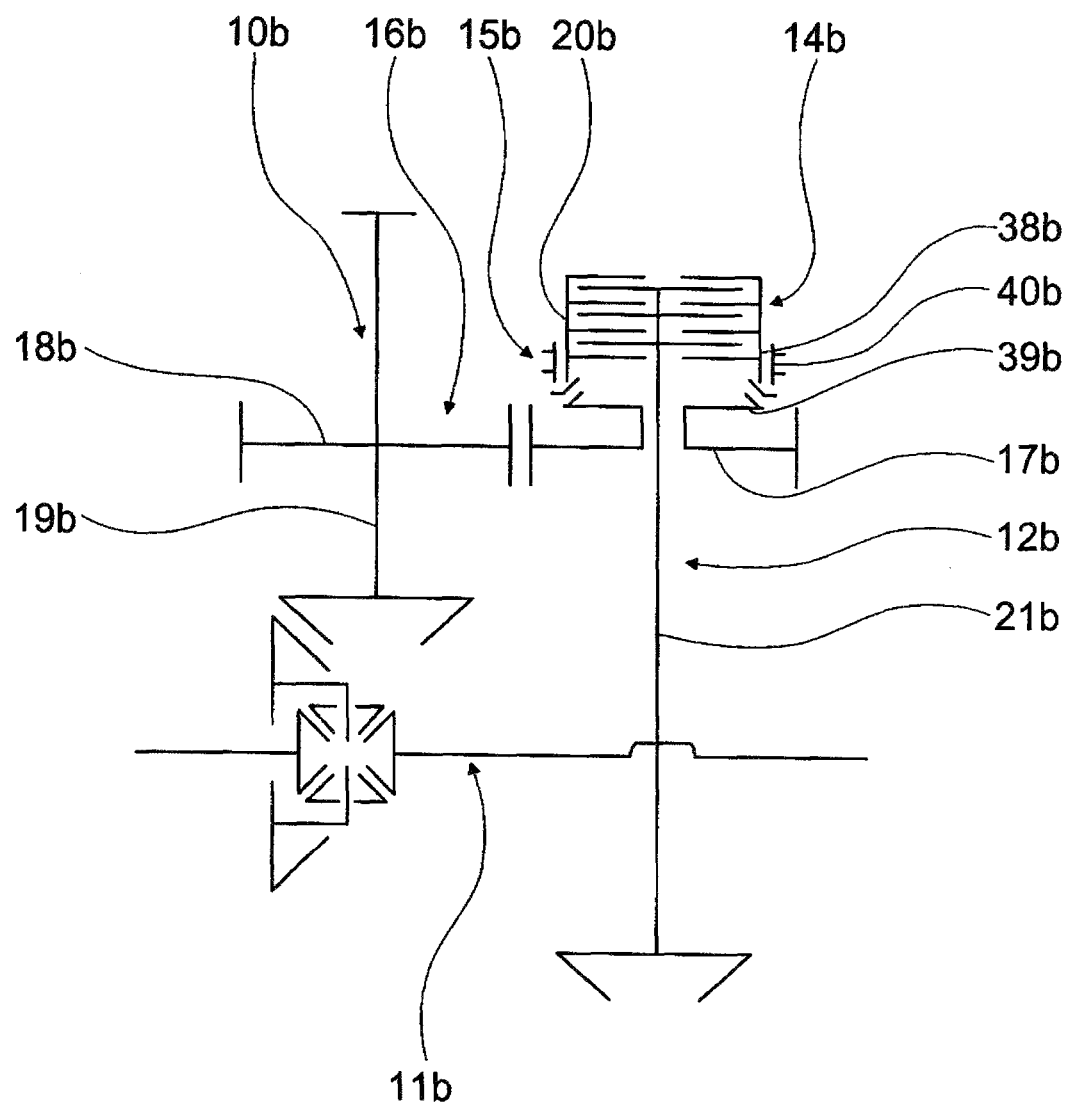
FIG. 2 shows a motor vehicle drive arrangement with a switching unit, wherein the switching unit is arranged directly adjacent to the clutch device.

FIG. 2 shows a motor vehicle drive device with a main drive train 10*b* for driving a main drive axle 11*b* and with an auxiliary drive train 12*b* for driving an auxiliary drive axle. The main drive train 10*b* comprises a permanently driven main drive shaft 19*b*. The auxiliary drive train 12*b* comprises a power-shift clutch device 14*b* which is provided to connect the auxiliary drive axle to the main drive train 10*b*. The auxiliary drive train 12*b* further comprises a spur gear stage 16*b* with an idler 17*b* and a fixed gear 18*b*. In addition the auxiliary drive train 12*b* comprises an auxiliary drive shaft 21*b* arranged offset relative to the main drive shaft 19*b*. The clutch device 14*b* is arranged coaxially with the auxiliary drive shaft 21*b*.

Furthermore the auxiliary drive train 12*b* comprises a switching unit 151*a* which is provided to switch the clutch device 14*b* without a differential speed. The switching unit 15*b* is provided to decouple, in an open operating state, the clutch device 14*b* from the main drive train 10*b*. The switching unit 15*b* is arranged in a force flow between the main drive shaft 19*b* and the clutch device 14*b*.

Unlike the preceding exemplary embodiment, the idler 17*b* of the spur gear stage 16*b* is rotationally securely connected to the main drive shaft 19*b* of the main drive train 10*b*. The clutch device 14*b* comprises an input element 20*b* which is arranged coaxially with the idler 17*b*. The switching unit 15*b* is provided to connect the idler 17*b* rotationally securely to the input element 20*b* of the clutch device 14*b*. The switching unit 15*b* is thus arranged directly adjacent to the clutch device 141D. The switching unit 15*b* comprises three positive-locking elements 38*b*, 39*b*, and 40*b*. The first positive-locking element 39*b* is rotationally securely connected to the idler 17*b*. The second positive-locking element 38*b* is rotationally securely connected to the input element 20*b* of the clutch device 14*b*. The third positive-locking element 40*b* is rotationally securely and axially displaceably connected to the input element 20*b* of the clutch device 14*b*.

Figure 3:
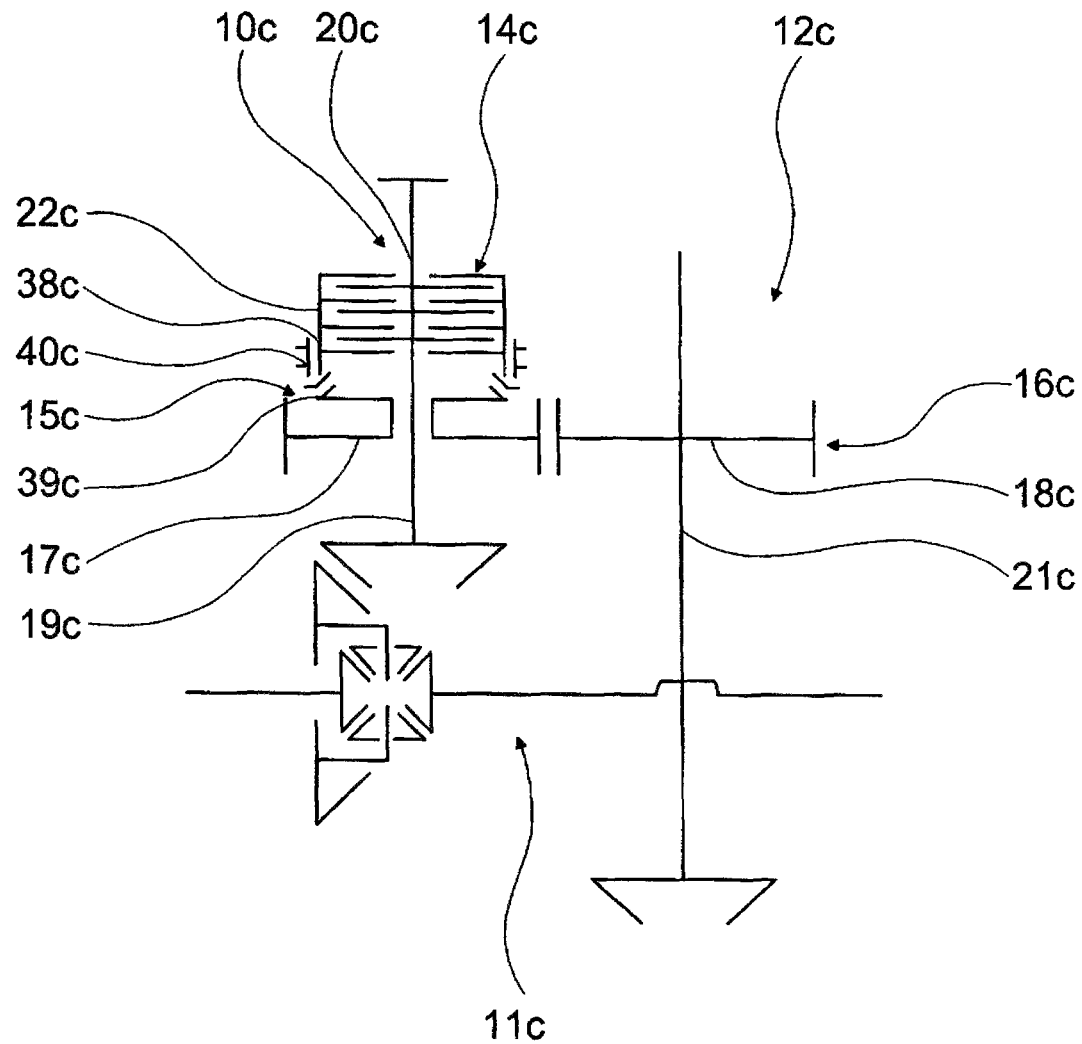
FIG. 3 shows a motor vehicle drive arrangement which comprises a clutch device arranged coaxially with a main drive shaft and a switching unit.

FIG. 3 shows a vehicle drive device with a main drive train 10*c* for driving a main drive axle 11*c* and with an auxiliary drive train 12*c* for driving an auxiliary drive axle. The main drive train 10*c* comprises a permanently driven main drive shaft 19*c*. The auxiliary drive train 12*c* comprises a power-shift clutch device 14*c* which is provided to connect the auxiliary drive axle to the main drive train 10*c*. The auxiliary drive train 12 further comprises a spur gear stage 16*c* with an idler 17*c* and a fixed gear 18*c*. In addition the auxiliary drive train 12*c* comprises an auxiliary drive shaft 21*c* arranged offset relative to the main drive shaft 19*c*, Furthermore the auxiliary drive train 12*c* comprises a switching unit 15*c* which is provided to switch the clutch device 14 without a differential speed.

Unlike in the preceding exemplary embodiments, the clutch device 14*c* is arranged coaxially with the main drive shaft 19*c*. An input element 20*c* of the clutch device 14*c* is permanently connected rotationally securely to the main drive shaft 19*c*. The switching unit 15*c* comprises a positive-locking element 38*c* which is permanently rotationally securely connected to an output element 22*c* of the clutch device 14*c*. The spur gear stage 16*c* is arranged in a force flow leaving the main drive shaft 19*c* after the clutch device 14*c* and the switching unit 15*c*.

The switching unit 15*c* is provided to decouple the clutch device 14*c* from a part of the auxiliary drive train 12*c* in an open operating state. In an open state of the switching unit 15*c*, the clutch device 14*c* is decoupled in particular from the spur gear stage 16*c* and the auxiliary drive shaft 21*c*. A differential speed, for example when the auxiliary drive shaft 21*c* is not rotating but the main drive shaft 19*c* is rotating results in a relative speed in the switching unit 15*c*. However, there is essentially no differential speed in the clutch device 14*c* due to drag torques in the clutch device 14*c* which are high in comparison with drag torques of the switching unit 15*c*, The clutch device 14*c* can thus be switched without a differential speed being present.

Similarly to the first exemplary embodiment, the idler 17*c* of the spur gear stage 16*c* is arranged rotationally on the main drive shaft 19*c*. The output element 22*c* of the clutch device 14*c* is arranged coaxially with the idler 17*c*. The switching unit 5*c* is provided to connect the idler 17*c* rotationally securely to the output element 22*c* of the clutch device 14*c*. The switching unit 15*c* is thus arranged directly adjacent to the clutch device 14*c*. The switching unit 15*c* comprises three positive-locking elements 38*c*, 39*c*, and 40*c*. The first positive-locking element 38*c* is rotationally securely connected to the output element 22*c* of the clutch device 14*c*. The second positive-locking element 39*c* is rotationally securely connected to the idler 17*c*. The third positive-locking element 40*c* is connected rotationally securely and axially displaceably to the output element 22c of the clutch device 14c. The fixed gear 18c of the spur gear stage 16c is rotationally securely connected to the auxiliary drive shaft 21c.

The auxiliary drive train 12c comprises, in addition to the auxiliary drive shaft 21c, two wheel drive shafts. Furthermore the auxiliary drive train 12c comprises two intermediate shafts and two clutch units which are provided to respectively connect one of the intermediate shafts rotationally securely to one of the wheel drive shafts. In order to connect the intermediate shafts to the auxiliary drive shaft 21c, the auxiliary drive train 12c comprises an axle drive. The switching unit 15c is arranged in the force flow before the axle drive and thus in the force flow before the intermediate shaft and the two clutch units.

Figure 4:
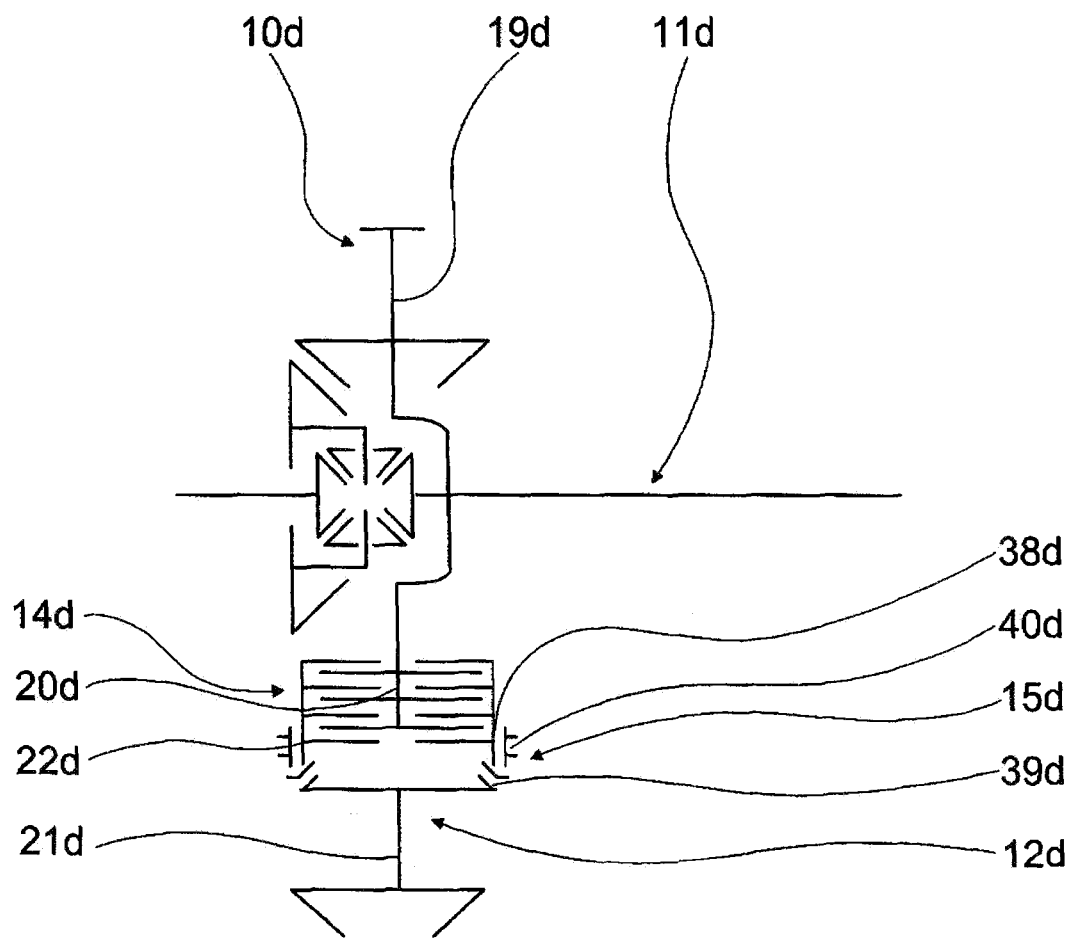
FIG. 4 shows a motor vehicle drive arrangement with an auxiliary drive shaft arranged coaxially with a main drive shaft, a clutch device and a switching unit.

FIG. 4 shows a motor vehicle drive device with a main drive train 10d for driving a main drive axle 11d and with, an auxiliary drive train 12d for driving an auxiliary drive axle. The main drive train 10d comprises a permanently driven main drive shaft 19d. The auxiliary drive train 12d comprises a power-shift clutch device 14d which is provided to connect the auxiliary drive axle to the main drive train 10d.

The auxiliary drive train 12d further comprises an auxiliary drive shaft 21d. Furthermore the auxiliary drive train 12d comprises a switching unit 15d which is provided to switch the clutch device 14d without a differential speed.

The switching unit 15d is provided to decouple the clutch device 14d in an open operating state from a part of the auxiliary drive train 12d. The clutch device 14d is decoupled in the open state of the switching unit 15d, in particular from the auxiliary drive shaft 21d. A differential speed, for example with a stationary auxiliary drive shaft 21d and rotating main drive shaft 19d, leads to a relative speed in the switching unit 15d. A differential speed in the clutch device 14d is virtually zero due to drag torques of the clutch device 14d which are high in comparison with drag torques of the switching unit 15d. The clutch device can thus be connected without a differential speed.

Unlike the first exemplary embodiment, the clutch device 14d is arranged coaxially with the main drive shaft 19d. An input element 20d of the clutch device 14d is permanently connected rotationally securely to the main drive shaft 19d. The switching unit comprises three positive-locking elements 38d, 39d, 40d. An output element 22d of the clutch device 14d is rotationally securely connected to the positive-locking element 38d of the switching unit 15d. The second positive-locking element 39d is rotationally securely connected to the auxiliary drive shaft 21d. The third positive-locking element 39d is rotationally securely and axially displaceably connected to the output element 22d of the clutch device 14d.

The auxiliary drive train 12d further comprises two wheel drive shafts, two intermediate shafts and two clutch units which are provided to respectively connect one of the intermediate shafts rotationally securely to one of the edge drive shafts. In order to connect the intermediate shafts to the auxiliary drive shaft 21d, the auxiliary drive train 12d comprises an axle drive. The switching unit 15d is arranged in the force flow before the axle drive and thus in the force flow before the intermediate shaft and the two coupling units.

What is claimed is:

1. A drive arrangement for a motor vehicle having a main drive axle (11a) and an auxiliary drive axle (13a), comprising a main drive train (10a; 10b; 10c; 10d) for driving the main drive axle (11a; 11b; 11c; 11d) and an auxiliary drive train (12a; 12b; 12c; 12d) for driving the auxiliary drive axle (13a), and a power-shift clutch device (14a; 14b; 14c; 14d) for connecting the auxiliary drive train (12a; 12b; 12c; 12d) to the main drive train (10a; 10b; 10c; 10d), the auxiliary drive train (12a; 12b; 12c; 12d) including at least one switching unit (15a; 15b; 15c; 15d) for engaging the clutch device (14a; 14b; 14c; 15d) without a differential speed drive, the switching unit (15a, 15b, 15c, 15d) and the clutch device (14a; 14b; 14c; 14d) being connected in series and the auxiliary drive axle (13a) including wheel drive shafts (34a, 35a) each provided with a clutch (23a, 24a) for decoupling at least one of the wheel drive shafts (34a, 35a) from the clutch device (14a).

2. The motor vehicle drive arrangement according to claim 1, wherein the switching unit (15a; 15b; 15c; 15d) is provided to decouple the clutch device (14a; 14b; 14c; 14d) from at least one of the main drive train (10a; 10b) and a part of the auxiliary drive train (12c; 12d) in at least one operating state.

3. The motor vehicle drive arrangement according to claim 1, wherein the switching unit (15a; 15b; 15c; 15d) is in the form of a positive-locking clutch.

4. The motor vehicle drive arrangement according to claim 1, wherein the auxiliary drive train (12a; 12b; 12c) comprises at least one spur gear stage (16a; 16b; 16c) arranged in the force flow before the clutch device (14a; 14b; 14c) with an idler (17a; 17b; 17c) in a rotationally secure manner.

5. The motor vehicle drive arrangement according to claim 4, wherein the main drive train (10a; 10c) comprises a main drive shaft (19a; 19c), with which the idler (17a; 17c) is arranged coaxially.

6. The motor vehicle drive arrangement according to claim 5, wherein the switching unit (15a) is provided to connect the idler (17a) rotationally securely to the main drive shaft (19a).

7. The motor vehicle drive arrangement according to claim 1, wherein the switching unit (15b; 15c; 15d) is arranged directly adjacent to the clutch device (14b; 14c; 14d).

8. The motor vehicle drive arrangement according to claim 1, wherein the switching unit (15b) comprises at least one positive-locking element (38b) which is rotationally securely connected to an input element (20b) of the clutch device (14b).

9. The motor vehicle drive arrangement according to claim 1, wherein the clutch device (14c, 14d) has an output element (22c, 22d) and the switching unit (15c; 15d) comprises at least one positive-locking element (38c; 38d) which is rotationally securely connected to the output element (22c; 22d) of the clutch device (14c; 14d).

10. The motor vehicle drive arrangement according to claim 5, wherein the auxiliary drive train (12a; 12b) comprises an auxiliary drive shaft (21a; 21b) arranged coaxially with the clutch device (14a; 14b), said auxiliary drive shaft (21a; 21b) being rotationally securely connected to an output element (22a) of the clutch device (14a).

11. The motor vehicle drive arrangement according to claim 10, wherein the auxiliary drive shaft (21a; 21b; 21c) is arranged offset relative to the main drive shaft (19a; 19b; 19c) and the spur gear stage (16a; 16b; 16c) is provided in at least one operating state to connect the auxiliary drive shaft (21a; 21b; 21c) to the main drive shaft (19a; 19b; 19c).

12. The motor vehicle drive arrangement according to claim 1, wherein the switching unit (15a; 15b; 15c; 15d) is synchronized.

13. The motor vehicle drive arrangement according to claim 1, wherein a control and regulating unit (41) which is provided to for closing the switching unit (15a; 15b; 15c; 15d) at least in a standby operating mode.

* * * * *